(12) United States Patent
Schrämmli et al.

(10) Patent No.: US 7,292,354 B2
(45) Date of Patent: Nov. 6, 2007

(54) APPARATUS FOR PHOTOELECTRIC MEASUREMENT OF AN ORIGINAL

(75) Inventors: Fortunat Schrämmli, Hausen bei Brugg (CH); Guido Keller, Watt (CH)

(73) Assignee: X-Rite Europe AG, Regensdorf (CH)

( * ) Notice: Subject to any disclaimer, the term of this patent is extended or adjusted under 35 U.S.C. 154(b) by 234 days.

(21) Appl. No.: 11/109,929

(22) Filed: Apr. 19, 2005

(65) Prior Publication Data

US 2005/0259263 A1 Nov. 24, 2005

(30) Foreign Application Priority Data

Apr. 20, 2004 (EP) ................... 04009331

(51) Int. Cl.
*G01N 21/25* (2006.01)
*G01C 11/12* (2006.01)

(52) U.S. Cl. ................... 356/639; 414/744.5; 356/444; 356/213; 33/706; 33/559; 700/245

(58) Field of Classification Search ................ 356/213, 356/444, 639; 700/213–226, 245, 256; 33/706–707, 33/558–559
See application file for complete search history.

(56) References Cited

U.S. PATENT DOCUMENTS

| | | | |
|---|---|---|---|
| 3,184,600 A | | 5/1965 | Potter |
| 3,692,406 A | * | 9/1972 | Blachut et al. ................ 356/2 |
| 4,518,862 A | | 5/1985 | Dorn |
| 5,452,078 A | | 9/1995 | Cheng |
| 5,513,946 A | * | 5/1996 | Sawada et al. .......... 414/744.5 |
| 5,587,796 A | | 12/1996 | Rakitsch et al. |
| 5,649,368 A | * | 7/1997 | Herzog et al. ................ 33/502 |
| 5,741,113 A | * | 4/1998 | Bacchi et al. ............ 414/744.5 |

OTHER PUBLICATIONS

European Search Report for EP 04 00 9331 mailed Nov. 5, 2004.

* cited by examiner

*Primary Examiner*—Gregory J. Toatley, Jr.
*Assistant Examiner*—Iyabo S Alli
(74) *Attorney, Agent, or Firm*—McCarter & English, LLP

(57) ABSTRACT

An apparatus for the photoelectric measurement of an essentially planar measurement original includes a photoelectric scanner and a positioning arrangement for the two dimensional movement of the scanner over the measurement original positioned on a supporting surface and the positioning at defined measurement locations on the measurement original. The positioning arrangement is constructed as a type of SCARA robot and includes a stationary base, a first and a second movable robot arm and a positioning control. The first robot arm is mounted on the stationary base for rotation by a motor about a first axis of rotation perpendicular to the supporting surface. The second robot arm is mounted at the free end of the first robot arm for rotation by a motor about a second axis of rotation perpendicular to the supporting surface and carries the scanner, and the positioning control is constructed for rotation of the two robot arms according to externally supplied positioning commands. The apparatus requires relatively little mounting space, is suitable for both remission and transmission measurements, and can be realized at relatively low construction cost.

18 Claims, 4 Drawing Sheets

APPARATUS FOR PHOTOELECTRIC MEASUREMENT OF AN ORIGINAL

FIELD OF THE INVENTION

The invention relates to an apparatus for photoelectric measuring of an essentially planar measurement.

BACKGROUND ART

In the graphics industry, so called test charts must often be densitometrically or calorimetrically measured, for which hand scanners are used. Such test charts include a large number of special measurement fields on a single sheet onto which a scanning head of the hand scanner is positioned for the measurement. Especially for test charts with a large number of measurement fields (e.g., (several hundred), an automatic positioning of the scanner would significantly reduce the amount of time and effort required for positioning the scanning head.

Different solutions for this automatic positioning are already on the market. One of the best known solutions includes an X-Y Table which can receive a hand scanner and drive the hand scanner across the measurement original according to the principle of an X-Y slide table in two orthogonal coordinate directions under the control of a computer. The mechanics required to drive the hand scanner, such as motors and guides, require a relatively large amount of space and are therefore normally positioned under the table for the original. However, with this arrangement, a transmission measurement is then not possible. When transmission measurements are required, the mechanics for driving the hand scanner need to be positioned beside the support for the original, whereby the overall measurement arrangement becomes relatively large even for small sized originals including for example A4 size (210 mm×297 mm).

SUMMARY OF THE INVENTION

It is an object of the invention to improve such a prior art apparatus in such a way that it requires a minimal overall mounting space while being useful for both remission as well as transmission measurements. Furthermore, manufacture of the apparatus is mechanically realized mechanically in a simple and correspondingly cost efficient manner.

These objects of the invention are realized with the measurement apparatus in accordance with the invention characterized by the features of the independent claim. Especially advantageous embodiments and further developments of the measurement apparatus in accordance with the invention are the subject of the dependent claims.

This application claims priority to Application No. 04 009 331.2, filed Apr. 20, 2004, in the European Patent Office, the contents of which are incorporated by reference in their entirety.

BRIEF DESCRIPTION OF THE DRAWINGS

The invention is further described in the following by way of the drawings.

DETAILED DESCRIPTION OF THE PREFERRED EMBODIMENTS

Figure 1:
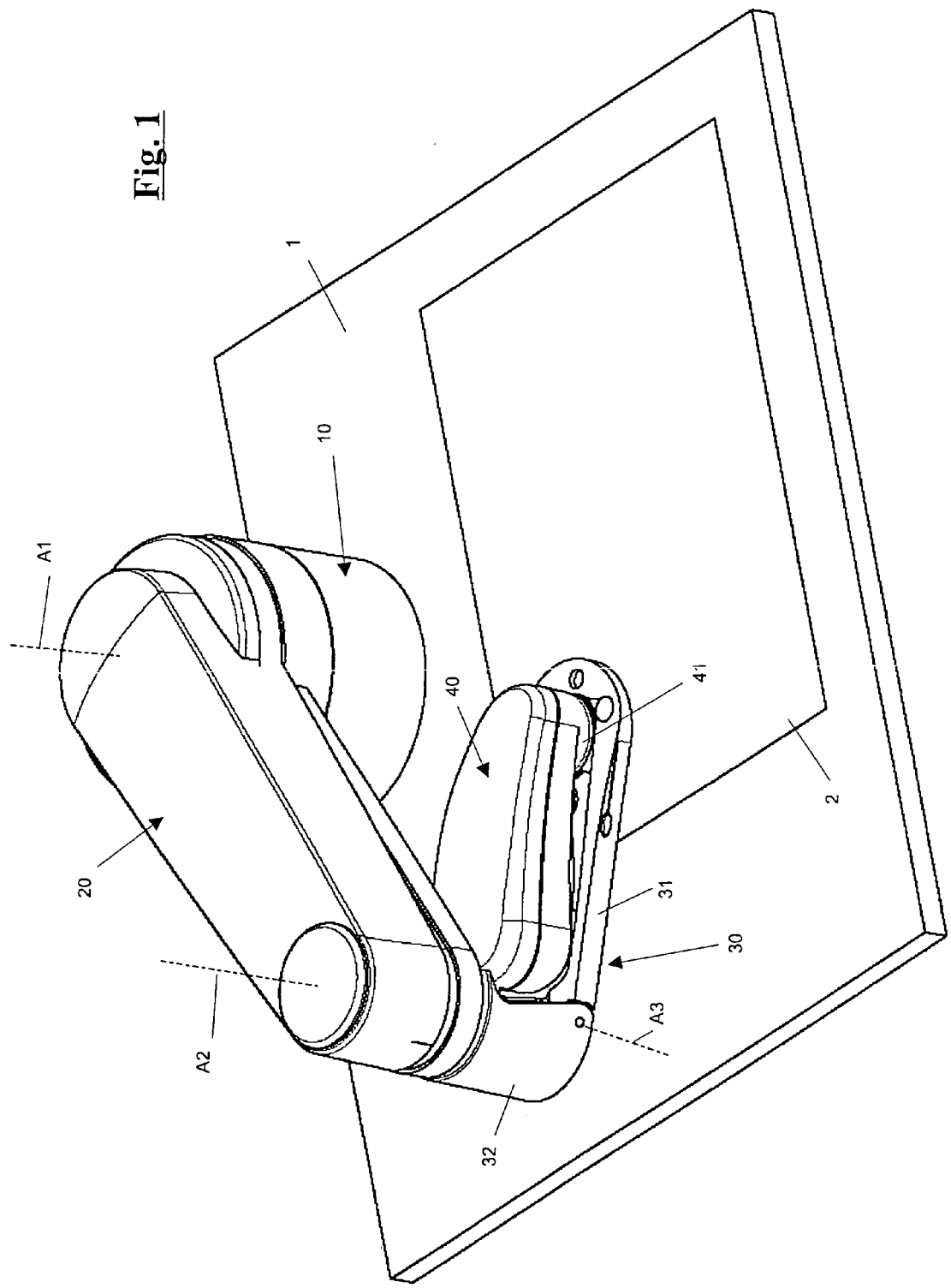
FIG. 1 shows a perspective view of an embodiment of a measurement apparatus in accordance with the invention.

The measurement apparatus illustrated in FIG. 1 is constructed on a base plate 1 which simultaneously forms the supporting surface for an original 2 to be measured.

The apparatus includes a base 10, which carries or houses all of the remaining components of the apparatus. The base 10 is removably fastened to the base plate 1 by way of a clamping arrangement (not illustrated), including for example, clamping bolts, but not is limited thereto. If the apparatus is to be used for transmission measurements on an illumination table, the base 10 can be fastened to the illumination table for example by a double-sided adhesive tape. In that case, the transparent cover plate of the illumination table would serve as the supporting surface for the original.

Figure 2:
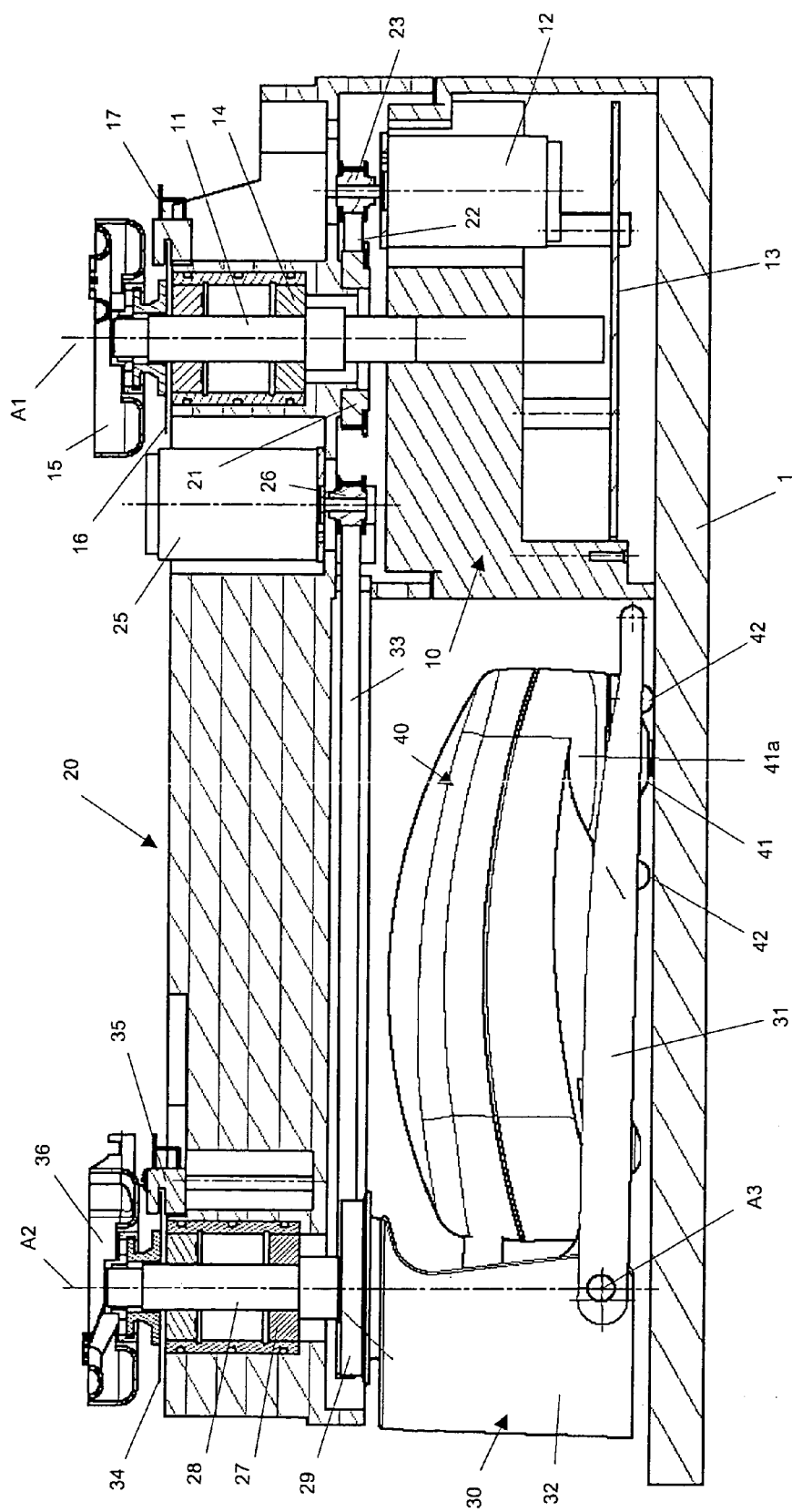
FIG. 2 shows a longitudinal section through the apparatus according to FIG. 1.

A first robot arm 20 is supported at one end on the base 10, which is stationary on the base plate or supporting surface 1, for rotation by a motor about a first axis of rotation A1 perpendicular to the base plate or supporting surface 1. A second robot arm 30 is supported on the free end of the first robot arm 20 for rotation by a motor about a second axis of rotation A2 perpendicular to the supporting surface 1. The second robot arm 30 carries a photoelectric hand scanner 40, including for example, an Eye-One hand spectrophotometer commercially available from Gretag-Macbeth AG. A positioning means (not illustrated) is adapted to the outer shape of the scanner 40 to ensure, in a generally known manner, a defined positioning and a secured fastening of the scanner to the robot arm 30. The scanner 40 is oriented so that a scanning head 41 of the scanner 40 is located in the vicinity of the free end of the second robot arm 30. A suitable opening is thereby provided in the robot arm 30 through which the scanning head 41 of the scanner 40 passes. The optical axis of the scanning head 41 is identified by 41a (FIG. 2).

As is immediately clear from FIG. 1, the scanning head 41 of the hand scanner 40 can be moved to any position of the measurement original 2 by suitable rotation of the two robot arms 20 and 30, whereby the working range which can be covered is of course limited by the dimensions of the two robot arms 20 and 30 and their possible angular positions. The base 10 together with the two robot arms 20 and 30 forms a dual-axis robot as principally generally known, for example, under the term SCARA-Robot ("Selective Compliant Assembly Robot Arm").

For adjustment of the height of the scanner 40 above the base plate 1, spacing disks (not illustrated) can be provided which are inserted between the base 10 and the base plate 1. The apparatus can thereby be adapted for the measurement of measurement originals of any thickness ("height").

According to a preferred embodiment, the second robot arm 30 is equipped with a hinged support 31 which is hinged (e.g., rotatably supported) at the rear part 32 of the robot arm 30 about a hinge axis A3 essentially parallel to the base plate or supporting surface 1 and enables movement of the scanner 40 or the scanning head 41 perpendicular to the supporting surface 1 or original 2. In an exemplary embodiment, hinged support 31 enables limited movement of the scanner 40 or the scanning head 41 perpendicular to the supporting surface 1 or original 2. The spacing between the scanning head 41 and the supporting surface 1 or the original 2 thereon can thereby be maintained constant even when the supporting surface 1 or the measurement original 2 are not completely planar or when the spacing must be adapted for thicker originals. The pivotal movement of the hinged support 31 is downwardly limited to a maximum of about 1 mm. A soft driving of the scanner 40 up onto the edges of even very thick originals is thereby guaranteed.

According to a further aspect of the invention, the second robot arm 30 or its hinged support 31 carrying the scanner 40 is provided with further openings (not illustrated) through which slide legs or slide rollers or balls 42 (FIG. 2) are receivable therein so that the scanner 40 can be supported thereby on the original 2. This not only ensures the correct spacing of the scanning head 41 from the measurement original, but results in a load relief of the two robot arms 20 and 30, which again enables a less costly mechanical construction. However, the device or the robot arms are principally self-supporting, and therefore, the supporting of the scanner 40 via balls 42, for example, on the original 2 serves primarily only for the maintenance of a constant measurement distance.

FIG. 2 shows various construction details of the measurement apparatus by way of a cross-section through the base 10 and the first robot arm 20.

A stationary hollow shaft 11 is co-axially mounted in the base 10, as well as a first direct current motor 12. Furthermore, a circuit board 13 is housed in the interior of the base 10, which carries the electronic components for a positioning control 50 (FIG. 4) to be described later in more detail.

The first robot arm 20 is rotatably mounted on the hollow shaft 11 by way of a ball bearing 14. A spur gear 21 is non-rotatably connected with the first robot arm 20 and is coupled by way of a toothed-belt 22 with a pinion 23 on the direct current motor 12 and is driven thereby. A bowl 15 for the receipt of electrical connecting conduits is disposed on top of the hollow shaft 11.

Above the ball bearing 14, a first coding disk 16 is rigidly mounted on the hollow shaft 11. An edge of the first coding disk 16 is surrounded by a first photoelectric incremental encoder 17. The incremental encoder 17 is connected with the first robot arm 20 and moves upon rotation of the latter along the circumference of the coding disk 16 and thereby scans the coding pattern found thereon. The first coding disk 16 and the first incremental encoder 17 together form a first angle encoder, which allows in a generally known manner the capture of the angular positions of the first robot arm 20 relative to the base 10 and the supply of the angular positions to the positioning control 50.

A second direct current motor 25 with a pinion 26 is rigidly positioned in the first robot arm 20 in the vicinity of its supported end. At the free end of the first robot arm 20, a second ball bearing 27 is incorporated which rotatably supports a further hollow shaft 28. The rear portion 32 of the second robot arm 30, and thereby the whole robot arm, is hung from this hollow shaft 28. A spur gear 29 is rigidly connected with the hollow shaft 28 and coupled by a toothed-belt 33 with the pinion 26 of the second direct current motor 25 and driven thereby.

A second coding disk 34 is rigidly connected with the hollow shaft 28 in the upper region thereof. A circumference of the second coding disk 34 is surrounded by a second incremental encoder 35 and scanned. The second incremental encoder 35 is rigidly positioned in the second robot arm 20. The second coding disk 34 and the second incremental encoder 35 together form a second angle encoder, which allows in a known manner, capture of the angular positions of the second robot arm 30 relative to the first robot arm 20 and supply of the angular positions of the second robot arm 30 relative to the first robot arm 20 to the positioning control 50. A further bowl 36 is disposed on the hollow shaft 28 to receive electrical connecting conduits.

An electrical plug-in connection is provided in the rear portion 32 of the second robot arm 30 which engages a plug-in connection on the hand scanner 40 for the remote control of the scanner by an external computer. A cable leads from this plug-in connection in the second robot arm 30 through the hollow shaft 28, spirally through the bowls 36 and 15 and finally through the hollow shaft 11 into the base 10 and from there to a plug-in connection provided therein for an external computer.

The electrical connecting conduits from the first incremental encoder 35, from the second direct current motor 25 and from the first incremental encoder 17 to the positioning control found on the circuit board 13 are also guided through the hollow shaft 11 into the base 10.

The two encoding disks 16 and 24 are preferably constructed as a film and provided with such a coding pattern that a resolution of about 8000 increments result, corresponding to an angular resolution of about 0.05°. The incremental encoder may include a HEDS-9000 series unit commercially available from Agilent Technologies, for example. The integration of the two angle encoders 16-17 and 34-35 into the support of the relatively mutually rotatable parts is constructively simple and realized in a cost efficient manner, in accordance with the invention.

Figure 3:
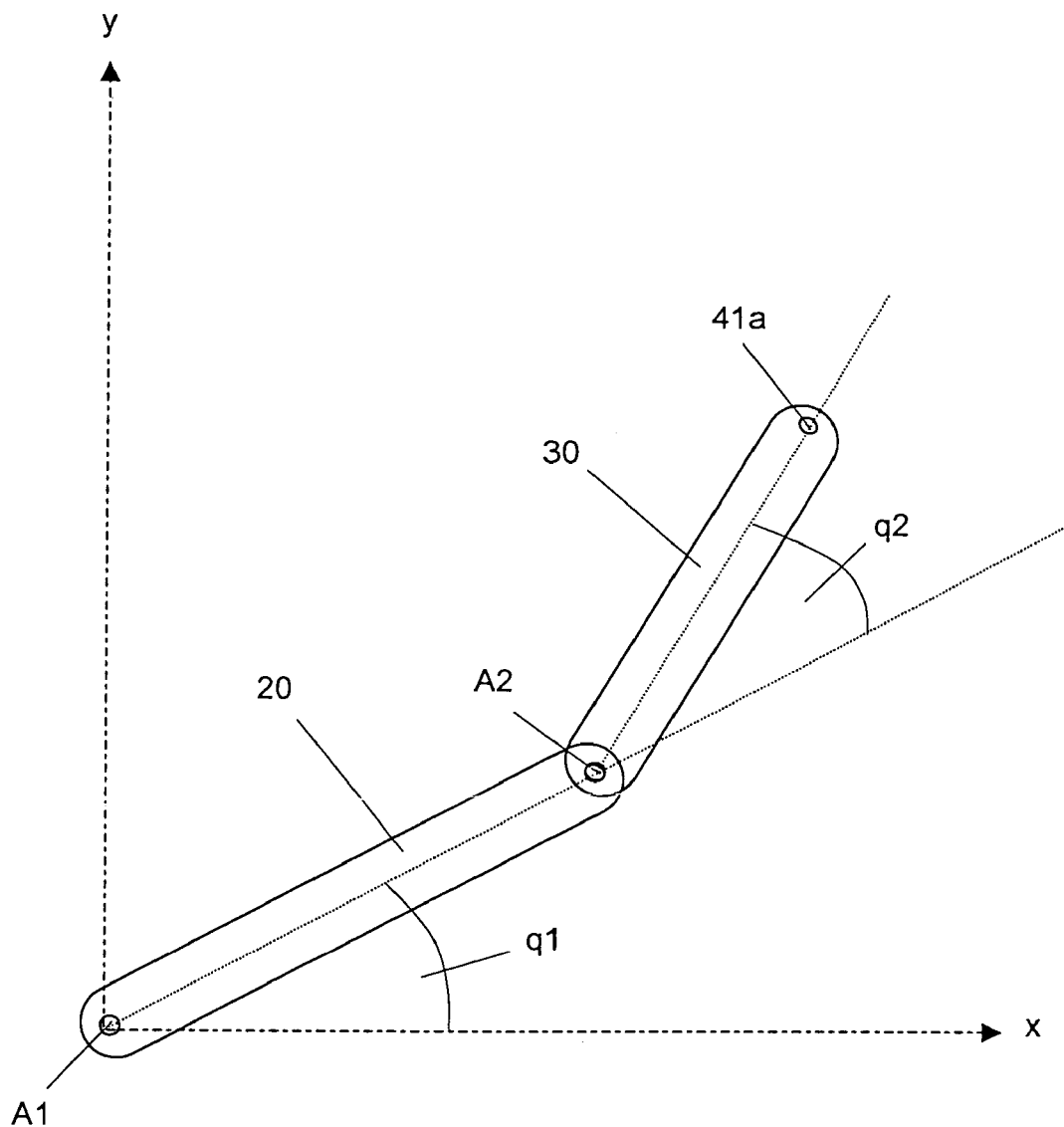
FIG. 3 is a sketch for the explanation of the kinematics of the robot arms.

The kinematic connections of the measurement apparatus are illustrated in FIG. 3. Axes x and y are thereby the axes of a Cartesian coordinate system, the origin of which is located on the first axis of rotation A1 of the first robot arm 20. The angle q1 represents the angular position of the first robot arm 20 relative to the x-axis. The angle q2 represents the angular position of the second robot arm 30 relative to the first robot arm 20. When L1 is the relevant length of the first robot arm 20 defined by the distance from the first axis of rotation A1 to the second axis of rotation A2 and L2 is the relevant length of the second robot arm 30 defined by the distance from the second axis of rotation A2 to the optical axis 41a of the scanning head 41, the following conditions obviously result between the Cartesian coordinates x and y and the optical axis 41a and the angles q1 and q2:

$$x=L1*\cos(q1)+L2*\cos(q1+q2) \quad y=L1*\sin(q1)+L2*\sin(q1+q2) \quad [1]$$

Figure 4:
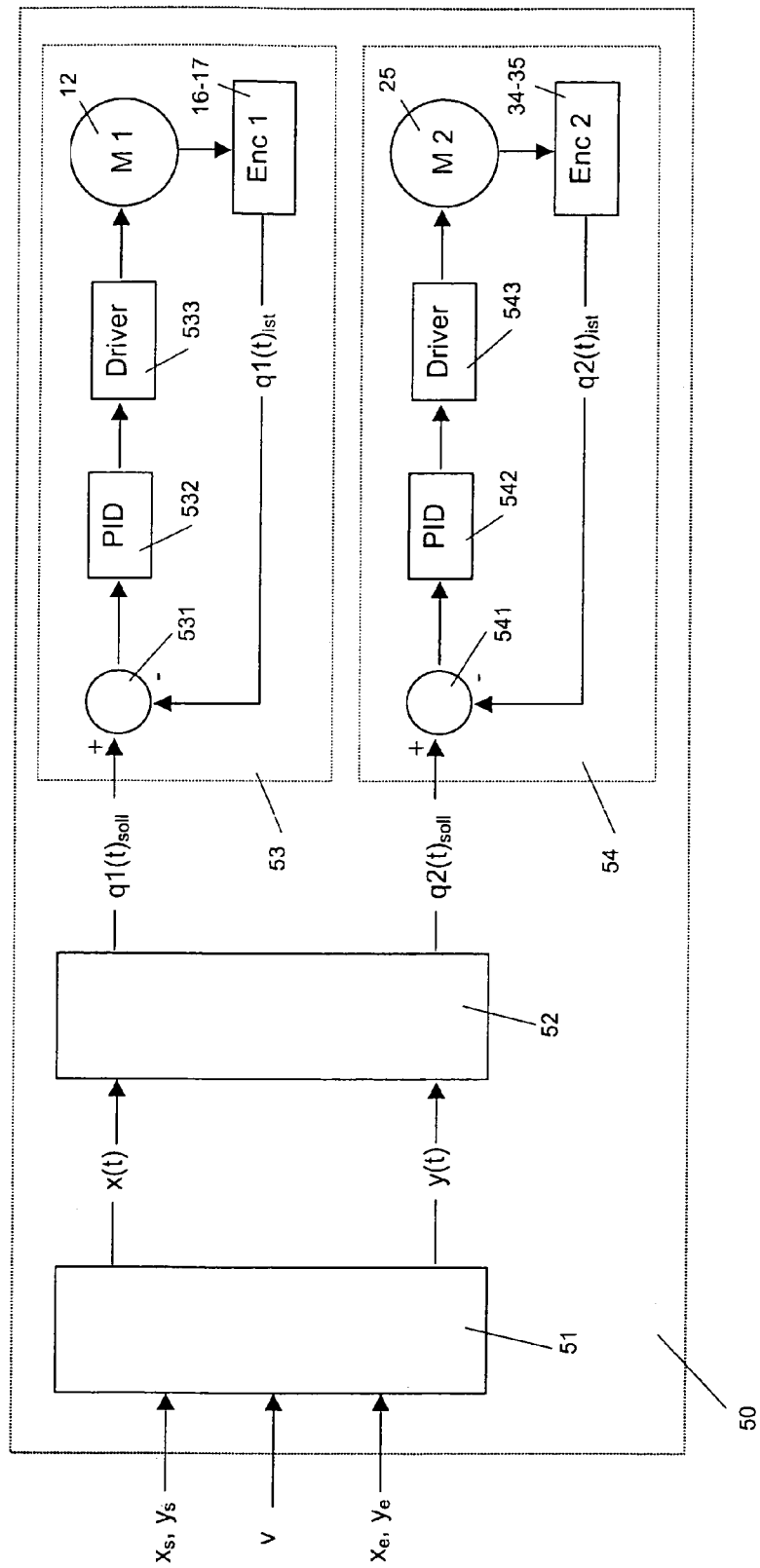
FIG. 4 is a block schematic of the position control of the apparatus in accordance with the invention.

The already mentioned positioning control 50 is illustrated in a block diagram in FIG. 4. The positioning control 50 includes essentially a track position generator 51, a kinematics stage 52 and two control circuits 53 and 54. The two control circuits 53, 54 each respectively include an angle comparator 531, 541, a proportional-integral-differential-controller (PID) 532, 542 and a motor driver 533, 543 and further include respectively one of the direct current motors 12, 25, as well as respectively one of the angle encoders 16-17, 34-35.

First, the size and orientation of the measurement original 2 located on the base plate 1 is determined. For this, a visible reference point (e.g., a sight) at the free end of the second robot arm 30 is moved manually, or under electronic control to three corner points of the measurement original 2. The reference point thereby has a defined spacing from the optical axis 41a of the scanning head 41 of the scanner 40. The corresponding x-y coordinates in relation to the scanning head 41 or its optical axis 41a are then calculated (in an external computer) from the angular positions q1 and q1 at these three corner points in connection with the defined spacing reference point-optical axis 41a, and stored. The size and orientation of the measurement original 2 is directly calculable from the x-y coordinates of the three corner points. The electronically controlled movement of the reference point to the three corner points of the measurement original can be realized, for example, in such a way that commands for the movement of the scanning head 41 in x and y directions are given to the positioning control 50 by an external computer (not illustrated) by pressing suitable keys. The alternate manual movement can also be easily achieved, since the supports of the robot arms 20, 30 have only a small friction moment when the drive motors are not electrified. When the reference point is at the desired position above a corner point, the associated angular positions can be transferred to an external computer upon the operation of a suitable key at the computer and calculated into absolute x-y coordinates. These x-y coordinates, as already mentioned, are in relation to the optical axis 41a of the scanning head 41.

As in the known X/Y—table solutions for many common commercial measurement originals (test charts), the geometric data (dimensions) and the (relative) coordinates of the measurement fields present, as well as information on their construction, are stored in the external computer. When, as described above, the absolute x-y coordinates of the corner points of the concrete measurement original are known, relative coordinates stored for the concrete measurement original can be converted into absolute coordinates with the help of these corner point coordinates. The absolute coordinates are then used as positioning commands for the control of the measurement apparatus.

After these preparatory steps, the apparatus is ready for the automated measurement of the measurement original.

Positioning commands are supplied by an external computer to the track position generator 51 through a connection (not illustrated). These positioning commands represent the (absolute) Cartesian coordinate values $x_s$, $y_s$ of a starting point (on the measurement original), the Cartesian coordinate values $x_e$, $y_e$ of an end point and a speed value v. The track position generator 51 now produces from these positioning commands a temporal sequence of Cartesian coordinate values x(t) and y(t), which represent a linear track of the scanner 40 (more precisely of the optical axis 41a of the scanning head 41) between the starting point and the end point (on the measurement original).

The kinematics stage 52 calculates from these coordinate values x(t) and y(t) a corresponding temporal sequence of nominal angular positions $q1(t)_{soll}$ and $g2(t)_{soll}$ for the two robot arms 20 and 30. This calculation is carried out simply by resolving the above two equations [1] for q1 and q2.

The two control circuits 53, 54 finally control the two direct current motors 12 in such a way that the actual angular positions $q1(t)_{ist}$ and $q2(t)_{ist}$ captured by the angle encoders 16-17 and 34-35 correspond to the preset nominal angular positions $q1(t)_{soll}$ and $q2(t)_{soll}$, and the scanning head 41 of the scanner is thereby moved over the measurement original 2 at the commanded speed from the commanded starting point to the commanded end point. During the movement of the scanning head 41; the measurement original 2 is scanned in a generally known manner and the measurement data are transmitted to the connected external computer.

For use of the measurement apparatus for different measurement applications, the base plate 1 can be made white on one side and black on the other. The apparatus is then mounted on one or the other side of the base plate 1, as desired.

A (physical) white reference is normally necessary for the calibration of the scanner 40. This can be provided, for example, on the base 10, whereby it naturally must be reachable by the scanning head 41 of the measurement apparatus. However, the white reference can also be provided, for example, on the hinged support 31 to be mechanically moveable into the measurement beam of the scanner 40, for example, by way of a pin.

Although the present disclosure has been provided with reference to exemplary embodiments thereof, the present disclosure is not to be limited thereto. Rather, modifications, enhancements and/or variations to the disclosed devices, systems and features are contemplated, and such modifications, enhancements and/or variations will not depart from the spirit or scope of the present disclosure.

We claim:

1. An apparatus for the photoelectric measurement of an essentially planar measurement original, comprising:
a photoelectric scanner for scanning a measurement original positioned on a supporting surface and a positioning arrangement for two-dimensional movement of the scanner over the measurement original and positioning the scanner at defined measurement locations of the measurement original, the positioning arrangement being constructed as a dual axis robot including a base, first and second movable robot arms, and a positioning control, the first robot arm being mounted on the base for rotation by a motor about a first axis of rotation perpendicular to the supporting surface, the second robot arm being mounted at a free end of the first robot arm for rotation by a motor about a second axis of rotation perpendicular to the supporting surface and carrying the scanner, and the positioning control being constructed for rotation of the two robot arms according to externally supplied positioning commands.

2. Apparatus according to claim 1, wherein the second robot arm includes a hinged support on which the scanner is mounted and which allows a limited movement of the scanner perpendicular to the supporting surface.

3. Apparatus according to claim 1, wherein the two robot arms are each respectively driven by a direct current motor and are provided with a first and a second angle encoder for the capture of the angular position of the two robot arms, the first and second angle encoders each respectively including a coding disk and an optical incremental encoder cooperating therewith.

4. Apparatus according to claim 3, wherein the coding disk of the first angle encoder is rigidly coaxially mounted on the first axis of rotation and the incremental encoder cooperating therewith is non-rotatably connected with the first robot arm.

5. Apparatus according to claim 3, wherein the coding disk of the second angle encoder is non-rotatably connected with the second robot arm and the incremental encoder cooperating therewith is positioned stationarily on the first robot arm.

6. Apparatus according to claim 3, wherein the positioning control includes a kinematics stage and two control circuits, the kinematics stage converts nominal Cartesian coordinate values (x(t), y(t)) supplied thereto into nominal angular positions (q1(t)soll and q2(t) soll) for each of the two robot arms, the control circuits each respectively include one of the two direct current motors and one of the two angle encoders, and the control circuits move the two robot arms to the nominal angular positions.

7. Apparatus according to claim 6, wherein the positioning control includes a track position generator stage which produces from externally supplied Cartesian starting and end coordinate values ($x_s$, $y_s$, $x_e$, $y_e$) and from an externally supplied speed value a temporal sequence of Cartesian coordinate values (x(t), y(t)) defining a linear track and transmits them as nominal coordinate values to the kinematics stage.

8. Apparatus according to claim 1, wherein the two robot arms are supported on hollow shafts which simultaneously function as passages for electrical connecting conduits.

9. Apparatus according to claim 1, wherein the base is adjustable in height relative to the supporting surface by way of spacing disks.

10. Apparatus according to claim 1, wherein the two robot arms are constructed to be self supporting.

11. Apparatus according to claim 1, further comprising a base plate to which the base is releasably affixed.

12. Apparatus according to claim 11, wherein the base is selectively affixable to one side or the other of the base plate.

13. Apparatus according to claim 11, wherein one side of the base plate is made essentially black and the other side essentially white.

14. Apparatus according to claim 1, further comprising a physical white reference positioned at the base.

15. Process for the determination of coordinate values of a selected position on a measurement original which is measured with a measurement apparatus according to claim 1, comprising:
- moving a reference point on the second robot arm to the selected position on the measurement original;
- capturing the associated angular positions of the two robot arms; and
- calculating from the angular positions the absolute Cartesian coordinates of the reference point.

16. Process according to claim 15, wherein the moving of the reference point includes manually moving the two robot arms while the drive motors are not electrified.

17. Process according to claim 15, wherein the moving of the reference point includes moving the two robot arms under manual control by motors.

18. Apparatus according to claim 2, further comprising a physical white reference positioned at the hinged support.

\* \* \* \* \*